United States Patent [19]

Hambsch et al.

[11] 3,928,503

[45] Dec. 23, 1975

[54] METHOD FOR WORKING UP CHLOROPOLYOLEFIN SOLUTIONS

[75] Inventors: Erich Hambsch, Inningen; Helmut Klug, Aystetten; Herbert Ortner; Walter Semmlinger, both of Gersthofen; Rudolf Wirtz, Goggingen, all of Germany

[73] Assignee: Hoechst Aktiengesellschaft, Frankfurt am Main, Germany

[22] Filed: July 15, 1971

[21] Appl. No.: 163,069

Related U.S. Application Data

[63] Continuation of Ser. No. 850,229, Aug. 14, 1969, abandoned.

[30] Foreign Application Priority Data

Aug. 31, 1968 Germany.............................. 1794061

[52] U.S. Cl......... 260/897 C; 260/42.46; 260/42.54
[51] Int. Cl.².......................................... C08L 23/28

[58] Field of Search................................ 260/897 C

[56] References Cited
UNITED STATES PATENTS

| | | | |
|---|---|---|---|
| 2,711,401 | 6/1955 | Lally.................................. | 260/45.7 |
| 3,275,715 | 9/1966 | O'Leary............................. | 260/889 |
| 3,355,519 | 11/1967 | Muller et al. ...................... | 260/897 |

FOREIGN PATENTS OR APPLICATIONS

| | | | |
|---|---|---|---|
| 620,978 | 5/1961 | Canada.............................. | 260/897 |

*Primary Examiner*—Carman J. Seccuro
*Attorney, Agent, or Firm*—Connolly and Hutz

[57] ABSTRACT

When chlorinated polyolefins are to be used in the form of compounds the solutions of the said chloropolyolefins in an organic solvent are suitably worked up by pouring them into a pulverulent compounding component contained in a drying mixer and simultaneously removing the solvent in vapor form.

5 Claims, No Drawings

METHOD FOR WORKING UP CHLOROPOLYOLEFIN SOLUTIONS

CROSS REFERENCE TO RELATED APPLICATION

This application is a continuation of application Ser. No. 850,229, filed Aug. 14, 1969, now abandoned.

The present invention relates to a method for working up chloropolyolefin solutions obtained by chlorinating polyolefins in organic solvents.

Chlorinated polyolefins, especially chlorinated polyethylenes are known as elastifiers for polyvinyl chloride. From among the processes for chlorinating polyolefins those in which chlorination is carried out in a solvent are especially important because owing to their special properties the chlorinated products obtained are excellently suitable for many fields of application. With all chlorination processes in liquid phase the working up of the chlorination solutions constitutes the most difficult problem from a technical point of view as the chlorination products, especially the chloropolyethylenes have a soft, rubber-like consistency.

Numerous processes have been proposed to isolate polymers of this type from solutions. It is possible, for example to distill off the solvent or more advantageously to eliminate the solvent by drying the solution on hot rolls as described in German Pat. No. 1,265,419. Still further, the solvent can be distilled off with steam or the chloropolyolefins can be precipitated in their solutions by adding nonsolvents, for example alcohols of low molecular weight. In all these processes, however, the chloropolyolefins, as far as they have elastic properties, are obtained in the form of lumps, crusts or rough sheets which must be comminuted with considerable expense and which are not free from solvent in most cases.

By spraying the chloropolyolefin solutions or emulsions agglomeration of the rubber-like particles obtained cannot be avoided, either.

According to another process described in German Pat. No. 1,109,365 the solution of a chlorinated polyolefin in a water-insoluble organic solvent is worked into an aqueous polyvinyl chloride dispersion, optionally with the aid of an emulsifier, the solvent is driven off and the pulverulent polymer mixture is filtered off. German Pat. No. 1,215,371 discloses an analogous mode of working up according to which a dispersing agent is added without using a carrier material. In either case water must be used as intermediate medium from which the polymers must be separated before they are dried. Hence, it follows that the known processes for working up chloropolyolefin solutions either yield the polymers in a form little suitable for further processing or they are very expensive.

It has now been found that chloropolyolefins obtained by chlorinating polyolefins in organic solvents and intended for compounding can advantageously be isolated from their solutions by pouring the chloropolyolefin solutions into a drying mixer containing a pulverulent to finly granular compounding component in an amount such that the finished compound contains at least 5 percent by weight thereof and simultaneously withdrawing the solvent as vapor.

Chloropolyolefin solutions which can be worked up according to the method of the invention are solutions obtained by chlorinating polyolefins in the presence of chlorobenzene, trichloroethylene, tetrachloroethylene, fluorinated hydrocarbons and preferably chloroform or $CH_2Cl_2$, more preferably carbon tetrachloride.

The solutions contain as chloropolyolefins chlorination products of polyethylene and polypropylene, as well as of copolymers of ethylene with varying amounts of propylene and/or butylene. The method of the invention is especially suitable for working up chlorinated polyolefins containing about 25 to about 50 percent of chlorine as obtained by the process claimed in Belgian Pat. No. 724,000. Solutions of sulfochlorinated polyolefins may also be worked up by the method of the invention.

Mixers that are especially suitable for working up the chloropolyolefin solutions are so-called drying mixers provided with heating and cooling means and means for reducing the pressure and varying the number of revolutions of the mixing element in the range of from about 200 to 3,000 revolutions per minute.

Suitable compounding components are organic as well as inorganic substances which are chosen according to the intended use of the mixture to be produced. They should preferably be pulverulent, but finely granulated substances can also be used. There are mentioned by way of example talc, chalk, kieselguhr, silica gel, polyvinyl acetate, chlorinated polyolefins, suspension, emulsion and mass polyvinyl chloride, polyvinylidene chloride, fluorine-containing polymers, as well as after-chlorinated polyvinyl chloride. It is likewise possible, of course, to use mixtures of the aforesaid substances. It is especially interesting to produce mixtures of chlorinated polyethylenes with polyvinyl chloride because compounds of this type can be used for various applications as thermoplasts that are resistant to cold and impact.

In the process of the invention it is essential to apply the chloropolyolefin solution as uniform as possible to the carrier material and to remove the solvent from the system as rapidly as possible. It is, therefore, expedient to operate at elevated temperatures - with the use of carbon tetrachloride solutions and an amount of compounding component of 5 to 30 percent by weight, calculated on the finished compound, for example at a temperature in the range of from about 40° to 65°C — and under reduced pressure, for example 10 to 100 mm of mercury. It is likewise possible to eliminate the solvent with the aid of an inert carrier gas which, when working under reduced pressure, is generally aspirated but may also be blown in. In some cases, especially when the proportion of compounding component is relatively high, the solution can be worked up at room temperature or even at a temperature above 65° up to about 100°C with consideration of the thermal stability under load of the respective mixture. Optimum results without too much stress on the material are obtained, however, under the first mentioned conditions.

The products obtained do not contain undesired foreign substances, for example dispersing agents, so that restrictions with regard to application possibly caused by the presence of disturbing components need not be considered.

As already mentioned above, the method of the invention is especially suitable for working up chloropolyethylene solutions in the presence of pulverulent polyvinyl chloride. The ratio of chloropolyethylene to polyvinyl chloride may be chosen in such a manner that the resulting compound has the chloropolyethylene content required for its practical application, for example the chloropolyethylene solution is applied to 80 parts by weight of polyvinyl chloride powder in an amount to obtain a mixture of polyvinyl chloride and chloropolyethylene in a ratio of 80 : 20. It is likewise possible to produce a compound with chloropolyethylene containing a smaller proportion of polyvinyl chloride or another carrier material. The lower limit of compounding component — which depends on the type used and the fact that still smaller amounts would bring about agglomeration — is about 20 to 30 percent by weight when polyvinyl chloride is used alone and about 5 percent for example, for silica gel. By adding further amounts of polyvinyl chloride the manufacturer may find without difficulty the composition suitable for his purpose.

A further advantage of the method of the invention resides in the fact that with the use of suitable apparatus the solvent used can be recovered practically without loss in dry form so that it may at once be re-used for the chlorination.

The following examples serve to illustrate the invention but they are not intended to limit it thereto.

EXAMPLE 1

100 Grams of polyvinyl chloride having a K value of 70 were introduced into a vacuum-tight drying mixer having a capacity of 7 liters and the stirring element of which had the shape of a cross of knives. The heating jacket was heated at 60°C and under a pressure of 50 mm of mercury and while stirring at a speed of 1,800 revolutions per minute, 1,670 grams of a 14 percent solution of a chlorinated low pressure polyethylene in carbon tetrachloride were drawn in in a thin jet through a narrow tube over a period of one hour. The temperature of the mixing components was maintained at 60°C by the heating jacket. The solution of the chlorinated low pressure polyethylene had been obtained by the process described in Example 1A of Belgian Pat. No. 724,000 by chlorinating polyethylene having a degree of molecular nonuniformity of 2.5 in carbon tetrachloride at a temperature of from 90° to 105°C under a pressure of 6 to 8 atmospheres gauge until a chlorine content of 37.4 percent was reached. When the addition of chloropolyethylene was terminated the mixture was stirred for one hour at 60°C under 50 mm of mercury. During this period of time the reaction heat must be dissipated by cooling the jacket with water owing to a diminution of the evaporative cooling.

330 Grams of a finely granular, freely flowing material consisting of 70 percent of chloropolyethylene and 30 percent of polyvinyl chloride were obtained. A content of carbon tetrachloride in the material could not be detected even by gas chromatography.

EXAMPLE 2

10 Grams of Aerosil (registered trade mark, chemically pure silicic acid in submicroscopic distribution of Messrs. Degussa, Germany) were introduced into the mixer described in Example 1 and the heating jacket was heated at 57°C. Under a pressure of 20 to 60 mm of mercury and with a speed of the stirring element of 2,000 revolutions per minute 1,710 grams of a 11.1 percent solution of a chlorinated low pressure polyethylene were added over a period of one hour at 55° to 57°C. The solution of the chlorinated low pressure polyethylene had been obtained by the process described in Example 3 of Belgian Pat. No. 724,000 by chlorinating polyethylene having a degree of molecular non-uniformity of 2.5 in carbon tetrachloride at 90° to 130°C under a pressure of from 6 to 8 atmospheres gauge until a chlorine content of 36.6 percent was reached. When the addition was terminated the mixture was treated for another 30 minutes under the above conditions. A coarsely granular material was obtained having an average particle size of about 3 mm. It contained 95 percent of chloropolyethylene.

EXAMPLE 3

100 Grams of chlorinated polypropylene which had been chlorinated in a fluidized bed and contained 62 percent of chlorine were introduced into a mixer as described in Example 1 and compounded as described in Example 2 at a temperature of from 60° to 65°C under a pressure of 5 to 35 mm of mercury with 1,350 grams of a 11.1 percent solution of chloropolyethylene in carbon tetrachloride prepared by the process described in Example 3 of Belgien Pat. No. 724,000. 250 Grams of a granular, freely flowing material was obtained containing 40 percent of chloropolypropylene and 60 percent of chloropolyethylene.

EXAMPLE 4

20 Kilograms of pulverulent polyvinyl chloride were introduced into a heatable and coolable vacuum tight drying mixer having a capacity of 150 liters, the stirring element of which operated in such a manner that the material to be mixed consisted of a circulating component and a flowing component. In the mixer the flow was directed upward along the internal wall and descended towards the center. Under a pressure of 40 mm of mercury 161 kilograms of a 12.4 percent solution of chloropolyethylene in carbon tetrachloride prepared by the process described in Example 1 of Belgien Pat. No. 724,000 were introduced through two opposite tubes leading through the jacket of the mixer into the upper quarter of the upward flowing material to be mixed. At the beginning the stirring element had a speed of about 1,000 revolutions per minute and the temperature corresponded to room temperature. Owing to the heat of friction the temperature rose quickly to 40°–45°C, it was maintained in this range by cooling with the aid of the double jacket of the mixer.

The addition of the chloropolyolefin solution was terminated after 45 minutes. After a further 5 minutes in the collector for the recovered solvent no more condensate was separated. The material was stirred for another 20 minutes at a reduced speed of the stirrer of about 400 revolutions per minute. The compounded material was transferred into a cooling mixer having a capacity of 300 liters where it was cooled to room temperature. 39.5 Kilograms of a freely flowing material were obtained having an average particle size of 2 mm and containing 50 percent of chloropolyethylene.

We claim:

1. A method for isolating chloropolyolefins in a solid, particulate form from solutions of chloropolyolefins obtained by chlorinating polyolefins in organic solvent which comprises adding said solution to a pulverulent to a finely granular component selected from the group consisting of polyvinyl acetate, chlorinated polyolefins, polyvinyl chloride, polyvinylidene chloride, flourine-containing polymers, chlorinated polyvinyl chloride and mixtures thereof while said component is being agitated and as the solution is added simultaneously removing the solvent from the resulting mixture so that said mixture remains in essentially a dry state, said component being present in an amount such that the isolated chloropolyolefin contains at least 5% by weight thereof.

2. The method of claim 1 wherein the solution of chloropolyolefin employs carbon tetrachloride as the solvent.

3. The method of claim 2 wherein the solution is of chloropolyethylene in carbon tetrachloride.

4. The method of claim 1 wherein the component is polyvinyl chloride.

5. A process according to claim 1 wherein the mixture is subjected to a temperature of from about 40° to 65°C. under a pressure of 10 to 100 mm of mercury in order to remove the solvent.

* * * * *